United States Patent
Lavi et al.

(10) Patent No.: US 12,072,884 B2
(45) Date of Patent: Aug. 27, 2024

(54) ALERT RULE EVALUATION FOR MONITORING OF LATE ARRIVING DATA

(71) Applicant: MICROSOFT TECHNOLOGY LICENSING, LLC, Redmond, WA (US)

(72) Inventors: Yaniv Lavi, Tel Aviv (IL); Rachel Lemberg, Herzliya (IL); Anton Vasserman, Herzliya (IL); Yair Yizhak Ripshtos, Tel Aviv (IL); Dor Bank, Tel Aviv (IL); Ofri Kleinfeld, Tel Aviv (IL); Raphael Fettaya, Tel Aviv (IL); Linoy Liat Barel, Tel Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 18/299,253

(22) Filed: Apr. 12, 2023

(65) Prior Publication Data

US 2023/0359625 A1   Nov. 9, 2023

Related U.S. Application Data

(62) Division of application No. 16/988,960, filed on Aug. 10, 2020, now Pat. No. 11,640,401.

(Continued)

(51) Int. Cl.
*G06F 7/00* (2006.01)
*G06F 11/30* (2006.01)
*G06F 11/34* (2006.01)
*G06F 16/2455* (2019.01)
*G06N 5/01* (2023.01)
*G06N 5/04* (2023.01)
*G06N 20/20* (2019.01)

(52) U.S. Cl.
CPC ........ *G06F 16/2455* (2019.01); *G06F 11/302* (2013.01); *G06F 11/3495* (2013.01); *G06N 5/01* (2023.01); *G06N 5/04* (2013.01); *G06N 20/20* (2019.01)

(58) Field of Classification Search
CPC .............. G06F 16/2455; G06F 11/302; G06F 11/3495; G06N 20/20; G06N 5/01; G06N 5/04
USPC .................................................. 707/600–899
See application file for complete search history.

(56) References Cited

U.S. PATENT DOCUMENTS

2023/0336447 A1* 10/2023 Kommula ........... H04L 41/0604

* cited by examiner

*Primary Examiner* — Isaac M Woo
(74) *Attorney, Agent, or Firm* — Newport IP, LLC; Jacob P. Rohwer

(57) ABSTRACT

A monitoring system is configured to distinguish between two types of alert rules— namely, invariant alert rules and variant alert rules—and to apply a different method of alert rule evaluation to each, wherein each alert rule evaluation method deals with the issue of latent data ingestion in a different way. By tailoring the alert rule evaluation method to the type of alert rule being evaluated, the system can apply an optimized approach for each type of alert rule in terms of achieving a trade-off between alert latency, alert accuracy, and cost of goods sold. In an embodiment, the system utilizes a machine learning model to classify a query associated with an alert rule as either increasing or non-increasing. Then, based on the query classification and a condition associated with the alert rule, the system determines if the alert rule is invariant or variant.

20 Claims, 8 Drawing Sheets

Related U.S. Application Data

(60) Provisional application No. 63/033,677, filed on Jun. 2, 2020.

ALERT RULE EVALUATION FOR MONITORING OF LATE ARRIVING DATA

CROSS-REFERENCE TO RELATED APPLICATIONS

This patent application is a divisional of U.S. patent application Ser. No. 16/988,960, filed Aug. 10, 2020, which claims priority to U.S. Provisional Patent Application No. 63/033,677, filed Jun. 2, 2020, the entirety of which is incorporated by reference herein.

BACKGROUND

Some conventional monitoring systems enable users to set up alert rules, wherein each alert rule comprises a query, a condition, and a rule frequency. For a given alert rule, the monitoring system performs the following operations at the rule frequency: (a) executes the query against a data store for an evaluation time window to obtain a query result for the evaluation time window; (b) determines whether the query result for the evaluation time window satisfies the condition; and (c) if the query result for the evaluation time window satisfies the condition, generates an alert for the evaluation time window. For each such iteration, the evaluation time window may be shifted forward by some fixed amount of time.

By way of illustration, an example of an alert rule for a monitoring system comprises a query that obtains a total number of computing devices experiencing greater than 90% CPU utilization during the evaluation time window, a condition of "exceeds 1000," and a rule frequency of 5 minutes. In accordance with this alert rule, every five minutes, the monitoring system queries the data store to determine the total number of computing devices experiencing greater than 90% CPU utilization during the relevant evaluation time window (e.g., the preceding 5 minutes), determines if that number exceeds 1000 and, if that number exceeds 1000, generates an alert for the relevant time window.

The process by which the data store receives data (e.g., log messages and/or metrics) from monitoring agents executing on the various different computing devices is sometimes referred to as "data ingestion." "Latent data ingestion" or "late arriving data" refers to a situation in which, due to delays in the propagation of data from various monitoring agents to the data store, not all the data that should be present in the data store for a given evaluation time window is available at the time an alert rule is evaluated against that time window. Such latent data ingestion can lead to a query associated with the alert rule returning inaccurate query results which in turn can cause an alert to be generated that shouldn't have been generated (a false positive) or cause an alert not to be generated when an alert should have been generated (a false negative).

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to a monitoring system that is configured to distinguish between two types of alert rules—namely, invariant alert rules and variant alert rules—and to apply a different method of alert rule evaluation to each, wherein each alert rule evaluation method deals with the issue of latent data ingestion in a different way. By tailoring the alert rule evaluation method to the type of alert rule being evaluated, the system can apply an optimized approach for each type of alert rule in terms of achieving a trade-off between alert latency, alert accuracy, and cost of goods sold (COGS). In an embodiment, the system utilizes a machine learning model to classify a query associated with an alert rule as either increasing (late-arriving data can only increase the query result produced by executing the query) or non-increasing. Then, based on the query classification and a condition associated with the alert rule, the system determines if the alert rule is invariant or variant.

Further features and advantages of the embodiments, as well as the structure and operation of various embodiments, are described in detail below with reference to the accompanying drawings. It is noted that the claimed subject matter is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the application and, together with the description, further explain the principles of the embodiments and to enable a person skilled in the relevant art(s) to make and use the embodiments.

Figure 1:
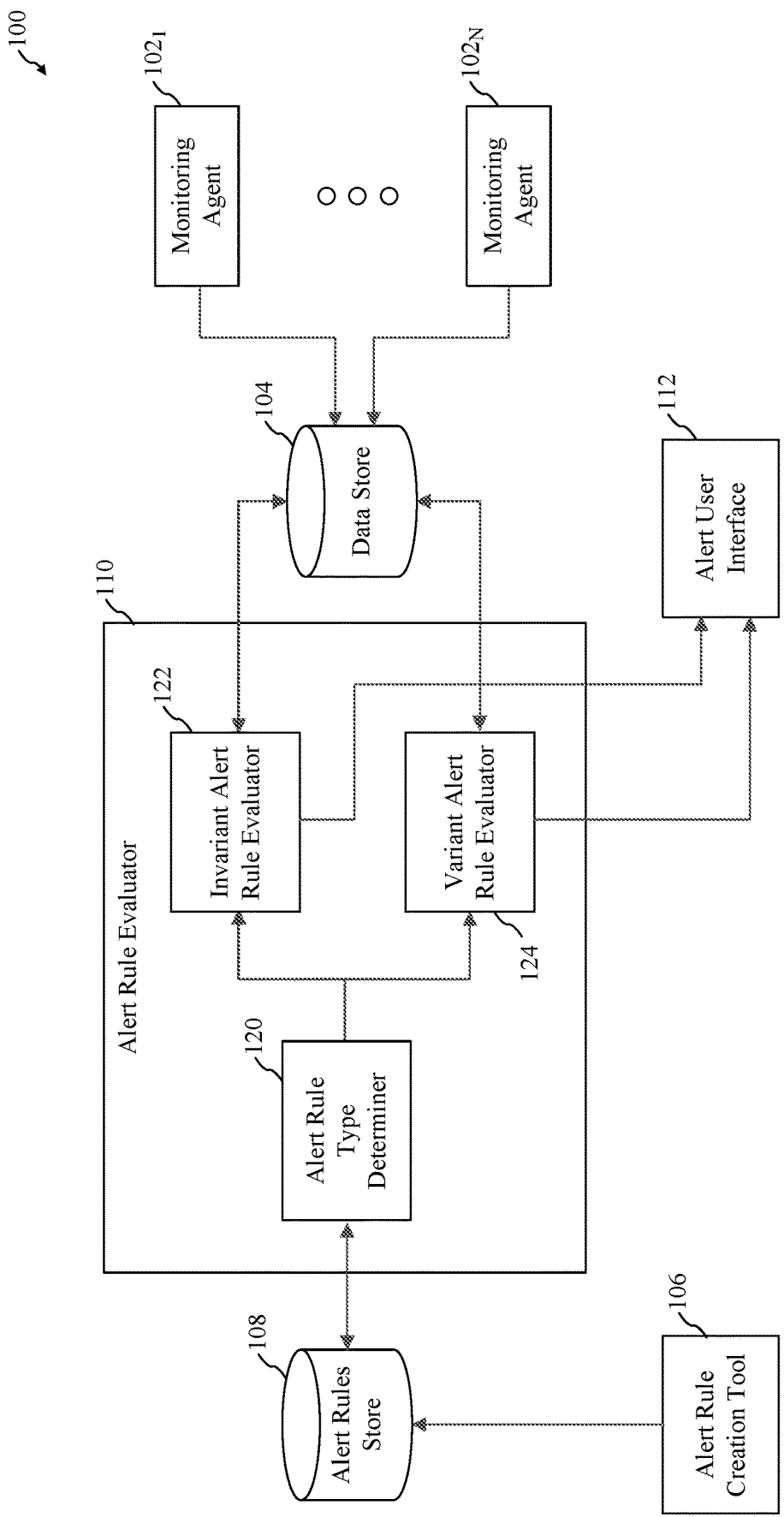
FIG. 1 is a block diagram of an example monitoring system that mitigates the effects of late arriving data on alert rule evaluation.

The features and advantages of the embodiments described herein will become more apparent from the detailed description set forth below when taken in conjunction with the drawings, in which like reference characters identify corresponding elements throughout. In the drawings, like reference numbers generally indicate identical,

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

The example embodiments described herein are provided for illustrative purposes and are not limiting. The examples described herein may be adapted to any type of method or system for securing access to computing resources of an accessory device. Further structural and operational embodiments, including modifications/alterations, will become apparent to persons skilled in the relevant art(s) from the teachings herein.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

As noted in the Background Section, above, some conventional monitoring systems enable users to set up alert rules, wherein each alert rule comprises a query, a condition, and a rule frequency. For a given alert rule, the monitoring system performs the following operations at the rule frequency: (a) executes the query against a data store for an evaluation time window to obtain a query result for the evaluation time window; (b) determines whether the query result for the evaluation time window satisfies the condition; and (c) if the query result for the evaluation time window satisfies the condition, generates an alert. For each such iteration, the evaluation time window may be shifted forward by some fixed amount of time.

In a monitoring system, the data store may store log messages and/or metrics generated by different computing devices. A log message generated by a computing device may comprise, for example, a set of data that describes an event that has occurred on the computing device. A metric generated by a computing device may comprise, for example, a measurement associated with a computing resource that is collected periodically (e.g., at a fixed-time interval) or intermittently over time.

By way of illustration, an example of an alert rule for a monitoring system comprises a query that obtains a total number of computing devices experiencing greater than 90% CPU utilization during the evaluation time window, a condition of "exceeds 1000," and a rule frequency of 5 minutes. In accordance with this alert rule, every five minutes, the monitoring system queries the data store to determine the total number of computing devices experiencing greater than 90% CPU utilization during the relevant evaluation time window (e.g., the preceding 5 minutes), determines if that number exceeds 1000 and, if that number exceeds 1000, generates an alert for the relevant time window. Alert rules may be of varying complexity. A more complex alert rule example comprises a query that obtains a count of the number of log messages that include a particular starting prefix and that also have an exception in their flow, wherein the Newport IP, LLC condition involves comparing the count to some threshold. Execution of the query to obtain the count in this case may involve, for example, joining an additional table that includes the exception information.

The process by which the data store receives data (e.g., log messages and/or metrics) from monitoring agents executing on the various different computing devices is sometimes referred to as "data ingestion." "Latent data ingestion" or "late arriving data" refers to a situation in which, due to delays in the propagation of data from various monitoring agents to the data store, not all the data that should be present in the data store for a given evaluation time window is available at the time an alert rule is evaluated against that time window. Such latent data ingestion can lead to a query associated with the alert rule returning inaccurate query results which in turn can cause an alert to be generated that shouldn't have been generated (a false positive) or cause an alert not to be generated when an alert should have been generated (a false negative).

One approach to dealing with the problem of latent data ingestion involves collecting latency statistics for each monitoring agent that contributes data to the data store and/or for groups of such monitoring agents. Using these latency statistics, a start time for alert rule evaluation can be selected that is intended to strike a balance between alert latency and accuracy. For example, if the earliest time an alert rule can be evaluated for a particular evaluation time window is T0, but the latency statistics suggest that only 30% of monitoring agents will have provided data for the particular evaluation time window at time T0, then a later start time may be selected. In further accordance with this example, if the latency statistics suggest that 98% of agents will have provided data for the particular evaluation time window by 5 minutes after T0, or T5, and 99% of monitoring agents will have provided data for the particular evaluation time window by 30 minutes after T0, or T30, then it may be determined that T5 should be selected as the alert rule evaluation start time since it appears to provide an acceptable tradeoff between alert latency and accuracy.

A significant problem with the foregoing approach to dealing with latent data ingestion is that it requires latency statistics to be collected and constantly updated for each of the monitoring agents and/or groups of monitoring agents. This is because the latency statistics for each monitoring agent and/or group of monitoring agents are typically dependent on a large number of dynamically-changing system parameters and thus the latency statistics themselves will change often over time and in unpredictable ways. Collecting and updating latency statistics is a costly process in terms of time and computing resources. Moreover, at a certain scale (e.g., cloud scale with a massive number of agents), maintaining such latency statistics becomes practically unmanageable.

Another problem with the use of the foregoing approach in a cloud-scale solution is that latency statistics will typically be aggregated across many customer accounts and alert rules and thus do not reflect how latent data ingestion can be expected to impact a specific customer or a specific alert rule. By necessity, this lack of granularity means that the start time selected for alert rule evaluation may not provide the desired tradeoff between latency and accuracy for every customer or for every alert rule.

Another potential approach for dealing with the problem of latent data ingestion is to use retries of the alert rule query on the data store. For example, the query may be retried against the same evaluation time window at times T0, T15 and T30 to allow up to 30 minutes for late data to arrive. However, this approach generates an additional load on the data store (which is incredibly significant in a cloud-scale solution), increases the likelihood of retry failures, and increases the cost of goods sold (COGS). Furthermore, this approach does not fully address the problem of unreliable results because of the data latency causing false or missed alerts.

Embodiments of a monitoring system are described herein that address one or more of the aforementioned shortcomings of conventional monitoring systems with respect to evaluating alert rules against data stores with late arriving data. In an embodiment, the monitoring system is configured to distinguish between two types of alert rules—namely invariant alert rules and variant alert rules—and to apply a different method of alert rule evaluation to each alert rule based on its determined type, wherein each method deals with the issue of latent data ingestion in a different way. As will be made evident by the description below, by tailoring the alert rule evaluation method to the type of alert rule being evaluated, the monitoring system can apply an optimized approach for each type of alert rule in terms of achieving a trade-off between alert latency, alert accuracy, and COGS.

FIG. 1 is a block diagram of an example monitoring system 100 that mitigates the effects of late arriving data on alert rule evaluation, thereby addressing one or more of the above-mentioned shortcomings of existing monitoring systems. As shown in FIG. 1, monitoring system 100 includes a plurality of monitoring agents 1021-102N and a data store 104. Monitoring agents 1021-102N may be installed on different respective computing devices and may execute thereon to collect information and to pass such information either directly or indirectly to data store 104 for storage thereby. For example, each of monitoring agents 1021-102N may operate to collect log messages generated by one or more computing devices and pass those log messages either directly or indirectly to data store 104 for storage thereby. A log message generated by a computing device may comprise, for example, a set of data that describes an event that has occurred on the computing device. Each of monitoring agents 1021-102N may also operate to periodically or intermittently collect measurements (i.e., metrics) from one or more computing devices and pass such metrics either directly or indirectly to data store 104 for storage thereby.

Each item of data (e.g., log message, metric) that is passed by monitoring agents 1021-102N to data store 104 may have a timestamp (or other suitable indicator of time) associated therewith. By way of example, a log message may include a timestamp that indicates a time at which an event occurred, while a metric may be passed with a timestamp that indicates when the metric was determined or observed. These timestamps are stored along with the log messages or metrics in data store 104 and enable the data stored in data store 104 to be analyzed with respect to various evaluation time windows, as will be discussed in more detail herein.

Data store 104 comprises a memory device or storage system that is configured to store the data that is passed thereto from monitoring agents 1021-102N. In an embodiment, data store 104 comprises a database along with a database management system that enables queries to be run against the database. In one example embodiment, data store 104 comprises a cloud-based database and database management system. For example, data store 104 may comprise a Microsoft® Kusto database along an Azure® Data Explorer service that is capable of executing queries (e.g., Kusto Query Language (KQL) queries) against the database. However, this is merely one example and is not intended to be limiting. Persons skilled in the relevant art will appreciate that any type of memory device or storage system may be used to implement data store 104.

As further shown in FIG. 1, monitoring system 100 includes an alert rule creation tool 106 and an alert rules store 108. Alert rule creation tool 106 may be installed on a computing device and executed thereon to enable a user to create an alert rule. An alert rule may comprise a query, a condition, and a rule frequency. Alert rules generated using alert rule creation tool 106 may be stored in alert rules store 108. Any number of instances of alert rule creation tool 106 may be executed on any number of computing devices to generate alert rules that are stored in alert rules store 108. Alert rules store 108 may be implemented on any memory device or storage system that is capable of storing the alert rules that are passed thereto from alert rule creation tool 106.

As still further shown in FIG. 1, monitoring system 100 includes an alert rule evaluator 110 and an alert user interface 112. Alert rule evaluator 110 is installed on one or more computing devices and executes on such computing device(s) to evaluate rules stored in alert rules store 108. Generally speaking, for a given alert rule (which comprises a query, a condition, and a rule frequency, as noted above), alert rule evaluator 110 will perform the following operations at the rule frequency: (a) execute the query against data store 104 for an evaluation time window to obtain a query result for the evaluation time window; (b) determine whether the query result for the evaluation time window satisfies the condition; and (c) if the query result for the evaluation time window satisfies the condition, generates an alert for the evaluation time window. For each such iteration, the evaluation time window may be shifted forward by some fixed amount of time.

Alerts generated by alert rule evaluator 110 are passed to alert user interface 112. Alert user interface 112 may be installed on a computing device and executed thereon to receive alerts generated by alert rule evaluator 110 and present them in a form that is perceptible by a user (e.g., in text rendered to a display). Any number of instances of alert user interface 112 may be executed on any number of computing devices to receive and present alerts that are generated by alert rule evaluator 110.

Alert rule evaluator 110 itself comprises an alert rule type determiner 120, an invariant alert rule evaluator 122, and a variant alert rule evaluator 124. Alert rule type determiner 120 operates to determine whether each rule in alert rules store 108 is an invariant alert rule or a variant alert rule. If alert rule type determiner 120 determines that an alert rule is an invariant alert rule, then that alert rule will be evaluated by invariant alert rule evaluator 122. However, if alert rule type determiner 124 determines that an alert rule is a variant alert rule, then that alert rule will instead by evaluated by variant alert rule evaluator 124.

An invariant alert rule is an alert rule for which, if the alert rule condition is met at some time t*, then the alert rule condition will by necessity also be met for any time t'>t*. A variant alert rule is any alert rule that is not an invariant alert rule.

To determine whether an alert rule is an invariant alert rule or a variant alert rule, alert rule type determiner 120 first classifies the query associated with the alert rule as one of an increasing query or a non-increasing query. Then, based on the classification of the query associated with the alert as one of increasing or non-increasing, and based on the condition associated with the query, alert rule type determiner 120 determines if the alert rule is variant or invariant.

The operation of alert rule determiner 120 is premised on the observation that a query associated with an alert rule may be classified as one of an increasing query, a decreasing query, or a non-monotone query. An increasing query is a query for which late-arriving data can only increase the query result. A decreasing query is a query for which late-arriving data can only decrease the query result. A non-monotone query is a query where late-arriving data can either increase the query result or decrease the query result. If the condition associated with the alert rule is known and the alert rule query type is also known, then a reliable determination of whether the alert rule is invariant or variant can be made.

By way of example, consider an alert rule in which the condition is that the query result is greater than some threshold value. In a case in which the query is classified as increasing, it can be seen that once the condition is met, retrying the query to capture late-arriving data will not alter the fact that the condition has been met, since retrying the query can only increase the query result and the threshold has already been exceeded. Thus, in this case, it can be seen that the alert rule is invariant. As another example, consider an alert rule in which the condition is that the query result is less than some threshold value. In a case in which the query is classified as decreasing, it can be seen that once the condition is met, retrying the query to capture late-arriving data will not change the fact that the condition has been met, since retrying the query can only decrease the query result and the query result has already dropped below the threshold. Thus, in this case also, it can be seen that the alert rule is invariant.

In contrast, consider again an alert rule in which the condition is that the query result is greater than some threshold value. In a case in which the query is classified as decreasing or non-monotone, it can be seen that even though the condition may be met at one point in time because the query result exceeds the threshold, subsequently retrying the query to capture late-arriving data may cause the query result to drop below the threshold due to the decreasing or non-monotone nature of the query. In this case, it can be seen that the alert rule is variant. Likewise, consider again an alert rule in which the condition is that the query result is less than some threshold value. In a case in which the query is classified as increasing, it can be seen that even though the condition may be met at one point in time because the query result is less than the threshold, subsequently retrying the query to capture late-arriving data may cause the query result to exceed the threshold due to the increasing nature of the query. In this case, it can be seen that the alert rule is variant.

In an embodiment of monitoring system 100, alert rules in which the condition is that the query result is less than some threshold value may be exceedingly rare. For such an embodiment, it may be reasonable to determine that alert rules are invariant only when the alert rule condition is "greater than a threshold" and the query type is increasing. In such an implementation, it may be sufficient to classify each query as either increasing or non-increasing (as opposed to increasing, decreasing, or non-monotone) in order to determine whether an alert rule is invariant or variant. Thus, as noted above, in an embodiment, alert rule type determiner 120 classifies the query associated with the alert rule as one of an increasing query or a non-increasing query and then, based on the classification of the query and on the condition associated with the query, determines if the alert rule is variant or invariant.

Figure 2:
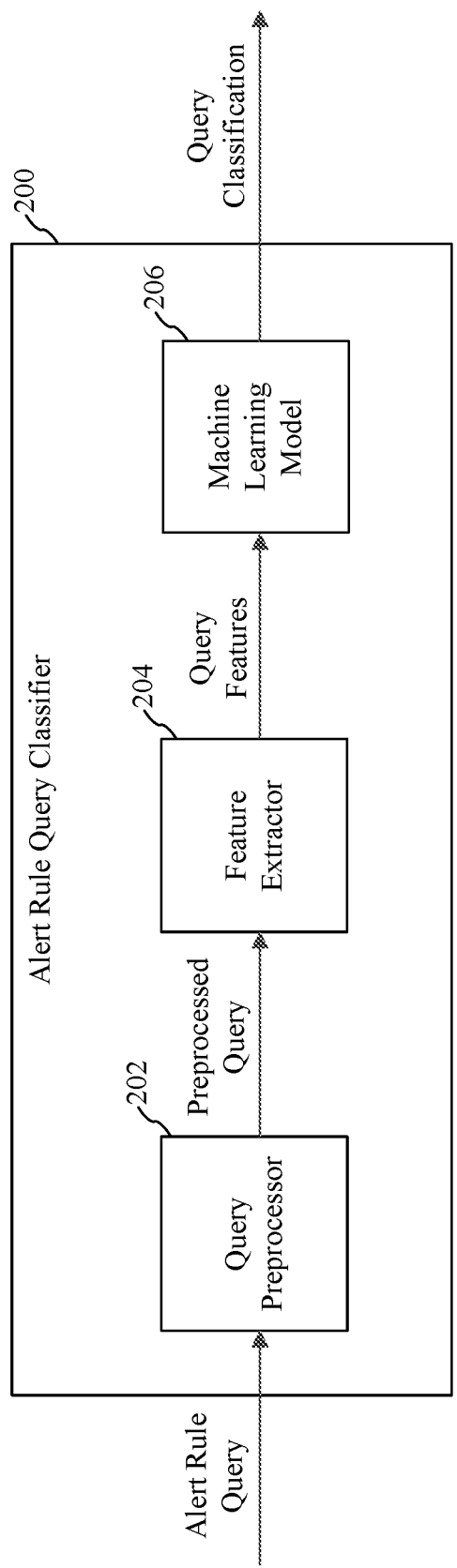
FIG. 2 is a block diagram of an alert rule query classifier that utilizes a machine learning model to classify an alert rule query in accordance with an embodiment.

In one embodiment, alert rule type determiner 120 utilizes a machine learning model to classify the query associated with an alert rule as either increasing or non-increasing. FIG. 2 is a block diagram of an alert rule query classifier 200 that may comprise part of alert rule type determiner 120 in accordance with such an embodiment. As shown in FIG. 2, alert rule query classifier 200 includes a query preprocessor 202, a feature extractor 204, and a machine learning model 206. Each of these components of alert rule query classifier 200 will now be described.

Query preprocessor 202 is configured to receive a query associated with an alert rule and to clean and/or normalize the query so that it is in a form more suitable for feature extraction, thereby producing a preprocessed query. For example, in an embodiment, query preprocessor 202 may operate to remove comments from the query. As another example, query preprocessor 202 may modify the query to ensure that each operator in the query is preceded by and followed by exactly one space. Thus, query preprocessor 202 may transform query text having the form "Perf| where a=='b'" into "Perf| where a == 'b'". However, these are merely examples, and query preprocessor 202 may modify the query in other ways in order to place it into a form more suitable for feature extraction. The preprocessed query generated by query preprocessor 202 is passed to feature extractor 204.

Feature extractor 204 is configured to receive the preprocessed query from query preprocessor 202 and to transform the preprocessed query into a plurality of features. These features may include one or more of the following example features: (1) query length (e.g., as determined by a count of the number of instances of "|" in the query, or by some other metric); (2) a count of certain tokens included in the query, including but not limited to: comparisons ('+', '==', '>=', etc.); commonly-used query language keywords (e.g., for KQL: 'by', 'summarize', 'max', 'avg', 'leftouter', etc.); names of commonly-used tables (e.g., 'Heartbeat', 'perf', 'Alerts', etc.); and certain combinations of tokens (e.g., 'timestamp <', 'timestamp >', 'max(timestamp)', 'AggregatedValue >', 'AggregatedValue <', 'AggregatedValue=', etc.); and (3) various advanced indicators. The advanced indicators may include, for example: an indicator that indicates if the query does not contain a known built-in table (this may occur in cases of custom metrics and functions which can obfuscate the query intent); an indicator that indicates if there is a 'take' operator or a 'limit' operator before a 'where' operator in the query (this can vary the query result in consecutive executions); an indicator that indicates if the query includes a filter with both 'where' and 'avg'; and an indicator that indicates if the query includes a filter with both 'summarize' and 'max'.

In an embodiment, one or more of the features may be derived from information other than the query text. For example, a feature may comprise an indicator if the alert rule with which the query is associated is a "number of results" alert rule (i.e., an alert rule that creates an alert when a specified number of records returned by a log search exceeds a specified number) or a "metric measurement" alert rule (i.e., an alert rule that generates an alert for each object in the results of a log search with values that exceed a specified threshold).

The features that are generated by feature extractor 204 are passed to machine learning model 206. Machine learning model 206 is an algorithm generated using machine learning techniques that accepts the features as inputs and, based on such inputs, outputs a query classification for the query. As noted above, the query classification may be one of an increasing query or a non-increasing query. In an embodiment, the output of the machine learning model is a probability that the query is increasing and alert rule type determiner 120 classifies the query as an increasing query if the probability exceeds a threshold; otherwise it classifies the query as non-increasing. In accordance with such an embodiment, the threshold may be tunable parameter of monitoring system 100. Lowering this threshold may result in more queries being classified as increasing and consequently more alert rules being classified as invariant, which can reduce alert latency but perhaps at the cost of accuracy. Conversely, raising the threshold may result in more queries being classified as non-increasing and consequently more alert rules being classified as variant, which can increase alert latency but perhaps also improve accuracy. In any case, alert rule type determiner 120 utilizes this query classification along with the alert rule condition to determine whether the alert rule with which the query is associated is invariant or variant.

In an embodiment, a Random Forest machine learning model is used to implement machine learning model 206, although any suitable machine learning model may be used and thus this example is not intended to be limiting. As will be appreciated by persons skilled in the relevant art(s), a Random Forest machine learning model is based on multiple decision trees, where each decision tree varies a bit from the others. The classification result is based on averaging the classification results of all the decision trees.

Figure 3:
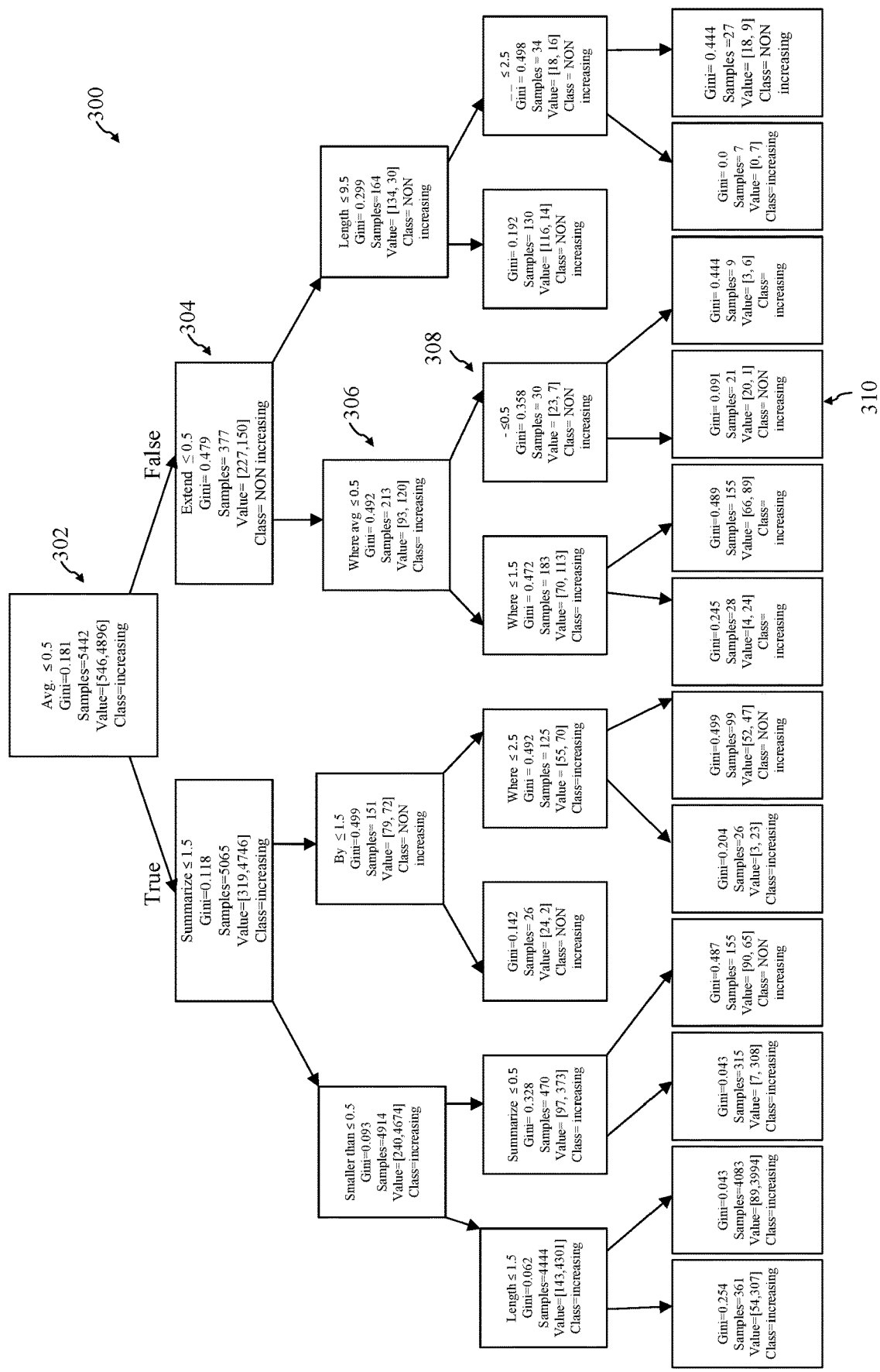
FIG. 3 depicts an example of a decision tree that may be created as part of a Random Forest machine learning model used for alert rule query classification.

FIG. 3 depicts an example of a decision tree 300 that may be created as the Random Forest machine learning model is built. In one example embodiment, the machine learning model aggregates one hundred trees, each of which is much larger than the one illustrated in FIG. 3. To illustrate how decision tree 300 may be used to generate a classification result, assume that the query being classified is Heartbeat|where avg(CPU)>50 and that this query is associated with an alert rule of the type "result count." The classification process carried out using decision tree 300 begins at node 302. At node 302, since 'avg' appears in the query, the 'avg' count will be greater than 0.5 and the tree will be traversed to the right to node 304. At node 304, since 'extend' does not appear in the query, the 'extend' count will be less than or equal to 0.5 and the tree will be traversed to the left to node 306. At node 306, since 'where avg' appears in the query, the 'where avg' count will be greater than 0.5 and the tree will be traversed to the right to node 308. At node 308, since '-' does not appear in the query, the '-' count will be less than 0.5 and the tree will be traversed to the left to node 310, thereby resulting in a classification result of "non-increasing."

In an embodiment, training data for training the machine learning model may be obtained by tracking the behavior of a number of queries (e.g., a very large number of queries) as they are retried over time against the same evaluation time window. In particular, each query may be periodically or intermittently retried a certain number of times against the same evaluation time window, and the query results obtained thereby may be observed to see if they increase, decrease, or stay the same after each retry. This process can be repeated a certain number of times for each query and a count may be maintained for each query that indicates how many times the retries produced an increasing result, a decreasing result, or a result that stayed the same. Based on these counts, each query can be labelled as one of increasing or non-increasing. The features derived from such queries and the labels associated therewith can then be used as training data to train the machine learning model.

A machine-learning based approach to query classification as discussed above is beneficial because for a given monitoring system there may be a massive number of different alert rule queries and many of these queries may be very complex. This makes classifying queries manually virtually impossible. Furthermore, although a heuristics-based approach to query classification could be adopted, developing classification rules through observation would be extremely labor intensive and any such rules would need to be augmented over time (e.g., to account for novel queries, database changes, etc.) in order to provide acceptable results. The machine-learning based approach described above allows the observed behavior of the queries themselves to drive the training of the machine learning model which means that the model can be trained quickly and efficiently while still providing a very high degree of accuracy.

Alert rule query classifier 200 may be configured to classify a query as increasing or non-increasing based on factors in addition to the output of machine learning model 206. For example, in an embodiment, alert rule query classifier 200 can classify a relatively new alert rule query as one of increasing or non-increasing based solely on the output produced by machine learning model 206. However, once alert rule evaluator 110 has stored sufficient information about how the query results associated with the alert rule query actually behave when the query is re-executed against the same evaluation time window, alert rule query classifier 200 can also rely on this actual performance information to classify the alert rule query, rather than solely on machine learning model 206. Thus, in such embodiments, alert rule query classifier 200 can utilize such actual performance information to correct incorrect classifications generated by machine learning model 206.

In a further embodiment, alert rule query classifier 200 may be configured to classify certain simple types of queries as increasing or non-increasing without using machine learning model 206, while other more complex query types are classified using machine learning model 206. For example, in accordance with such an embodiment, alert rule query classifier 200 may be configured to determine whether certain simple "metric measurement" alert rule queries are increasing or non-increasing based on whether such alert rule queries are simply an aggregation (e.g., avg, min, max, count, sum), whereas other types of alert rule queries that are more complex may be classified using machine learning model 206.

Figure 4:
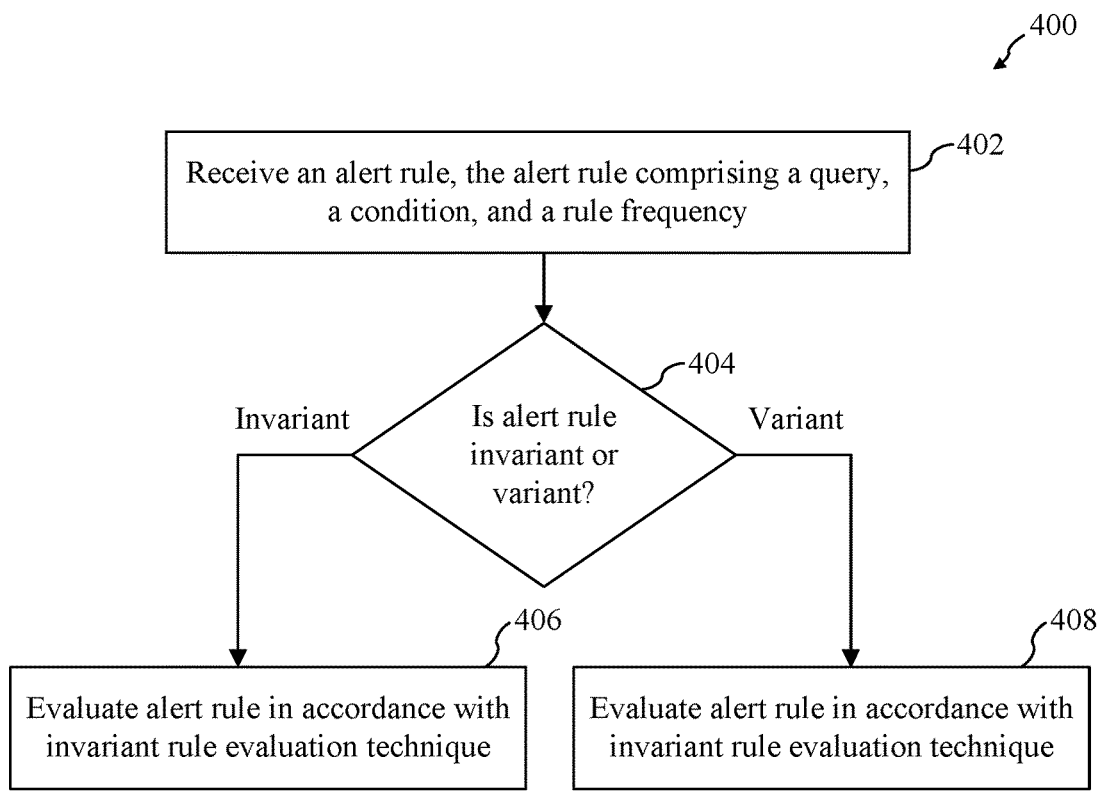
FIG. 4 depicts a flowchart of a method of performing alert rule evaluation in accordance with an embodiment.

The foregoing techniques for alert rule evaluation will now be further described with respect to FIGS. 4-7. In particular, FIG. 4 depicts a flowchart 400 of a method of performing alert rule evaluation in accordance with an embodiment. The method of flowchart 400 will now be described with continued reference to various components monitoring system 100 of FIG. 1. However, the method is not limited to that embodiment and persons skilled in the relevant art(s) will appreciate that the method may be performed by different components or systems entirely.

As shown in FIG. 4, the method of flowchart 400 begins at step 402, in which an alert rule is received, wherein the alert rule comprises a query, a condition and a rule frequency. For example, alert rule evaluator 110 may receive an alert rule from alert rules store 108. The alert rule may be obtained by alert rule evaluator 110 from alert rules store 108 in any manner. For example, alert rule evaluator 110 may read an alert rule directly from memory used to implement alert rules store 108. As another example, a copy of one or more alert rules stored in alert rules store 108 may be passed from a computing device or system upon which alert rules store 108 is implemented to a computing device or system upon which alert rule evaluator 110 is implemented. Still other methods of passing an alert rule from alert rules store 108 to alert rule evaluator 110 may be used.

At decision step 404, it is determined whether the alert rule is invariant or variant. For example, alert rule type determiner 120 may determine whether the alert rule is invariant or variant using any of the techniques discussed above.

As further shown in FIG. 4, if it is determined during decision step 404 that the alert rule is invariant, then control flows to step 406 in which the alert rule is evaluated in accordance with an invariant rule evaluation technique. For example, if alert rule type determiner 120 determines that the alert rule is invariant, then the alert rule may be evaluated in accordance with an invariant rule evaluation technique by invariant alert rule evaluator 122.

However, if it is determined during decision step 404 that the alert rule is variant, then control flows to step 408 in which the alert rule is evaluated in accordance with a variant rule evaluation technique. For example, if alert rule type determiner 120 determines that the alert rule is variant, then the alert rule may be evaluated in accordance with a variant rule evaluation technique by variant alert rule evaluator 124.

Figure 5:
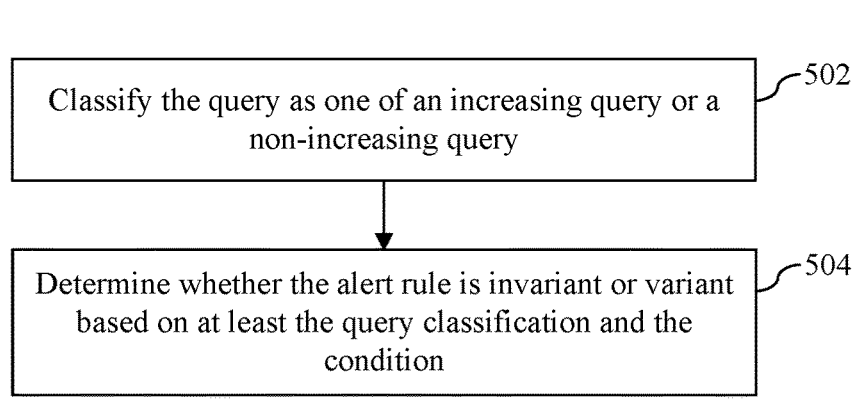
FIG. 5 depicts a flowchart of a method for determining whether an alert rule is invariant or variant in accordance with an embodiment.

FIG. 5 depicts a flowchart 500 of a method for determining whether an alert rule is invariant or variant in accordance with an embodiment. This method may be used, for example, to implement decision step 404 of flowchart 400. The method of flowchart 500 will now be described with continued reference to various components monitoring system 100 of FIG. 1. However, the method is not limited to that embodiment and persons skilled in the relevant art(s) will appreciate that the method may be performed by different components or systems entirely.

As shown in FIG. 5, the method of flowchart 500 begins at step 502 in which the query associated with the alert rule is classified as one of an increasing query or a non-increasing query. For example, alert rule type determiner 120 may classify the query associated with the alert rule as one of an increasing query or a non-increasing query using any of the techniques described above.

At step 502, it is determined whether the alert rule is invariant or variant based on at least the classification of the query as one of an increasing query or a non-increasing query and the condition associated with the alert rule. For example, alert rule type determiner 120 may determine whether the alert rule is invariant or variant based on at least the classification of the query as one of an increasing query or a non-increasing query and the condition associated with the alert rule.

Figure 6:
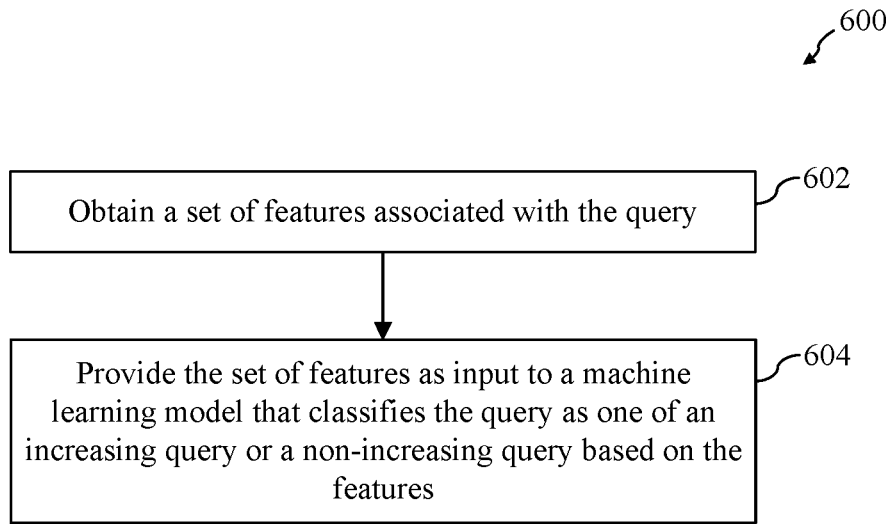
FIG. 6 depicts a flowchart of a method for determining if a query is one of an increasing query or a non-increasing query in accordance with an embodiment.

FIG. 6 depicts a flowchart 600 of a method for determining if a query is one of an increasing query or a non-increasing query in accordance with an embodiment. This method may be used, for example, to implement step 502 of flowchart 500. The method of flowchart 600 will now be described with continued reference to various components of alert rule query classifier 200 of FIG. 2. However, the method is not limited to that embodiment and persons skilled in the relevant art(s) will appreciate that the method may be performed by different components entirely.

As shown in FIG. 6, the method of flowchart 600 begins at step 602 in which a set of features associated with the query is obtained. For example, as discussed above, the query may be preprocessed by query preprocessor 202 to produce a preprocessed query and the preprocessed query may be processed by feature extractor 204 to produce a set of feature associated with the query.

At step 604, the set of features is provided as input to a machine learning model that classifies the query as one of an increasing query or a non-increasing query based on the set of features. For example, as discussed above, the set of features may be provided as input to machine learning model 206 that classifies the query as one of an increasing query or a non-increasing query based on the set of features.

Figure 7:
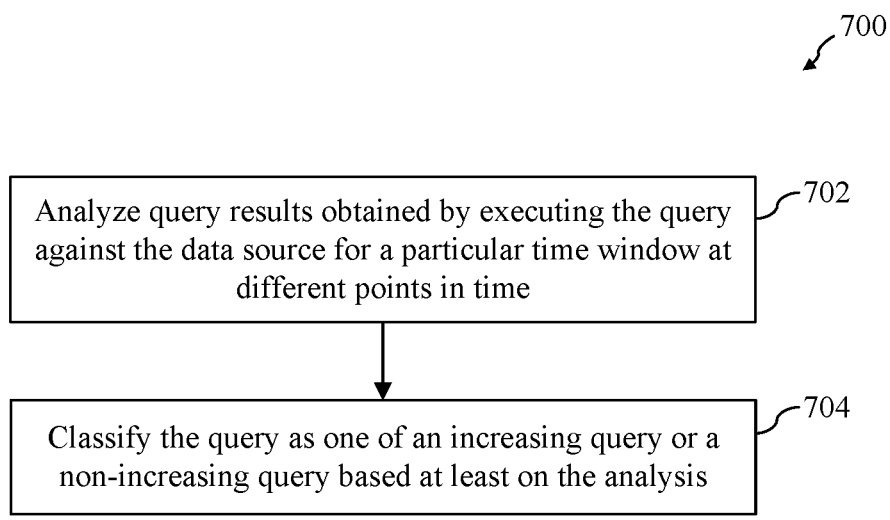
FIG. 7 depicts a flowchart of another method for determining if a query is one of an increasing query or a non-increasing query in accordance with an embodiment.

FIG. 7 depicts a flowchart 700 of another method for determining if a query is one of an increasing query or a non-increasing query in accordance with an embodiment. This method may be used, for example, to implement step 502 of flowchart 500. The method of flowchart 700 will now be described with continued reference to various components monitoring system 100 of FIG. 1. However, the method is not limited to that embodiment and persons skilled in the relevant art(s) will appreciate that the method may be performed by different components or systems entirely.

As shown in FIG. 7, the method of flowchart 700 begins at step 702 in which query results obtained by executing the query against the data source for a particular time window at different points in time are analyzed. For example, alert rule type determiner 120 may analyze query results obtained by executing the query against the data source for each of one or more time windows at different points in time. The query results that are analyzed may be accumulated over time as part of the normal alert rule evaluation process.

At step 704, the query is classified as one of an increasing query or a non-increasing query based at least on the results of the analysis carried out in step 702. For example, alert rule type determiner 120 may classify the query as one of an increasing query or a non-increasing query based at least on the results of the analysis carried out in step 702.

In an embodiment, the method of flowchart 700 is not performed until alert rule evaluator 110 has stored sufficient information about how the query results associated with the alert rule query actually behave when the query is re-executed against the same evaluation time window. Until such time as this actual performance information is obtained, query classifier 200 can be used to classify the alert rule query as one of increasing or non-increasing based solely on the output produced by machine learning model 206.

As noted above, if alert rule type determiner 120 determines that an alert rule is invariant, then such alert rule will be evaluated by invariant alert rule evaluator 122. For an invariant rule, once the alert rule condition is satisfied, it will always remain satisfied. Accordingly, for an invariant alert rule, to obtain perfect precision (all triggered alerts are correct) and perfect recall (no missed alerts), one could periodically retry the query for the same evaluation time window until the system's maximum allowed data ingestion latency for alerting is reached. However, as also noted above, executing retries generates an additional load on data store 104, increases the likelihood of retry failures, and increases COGS.

Figure 8:
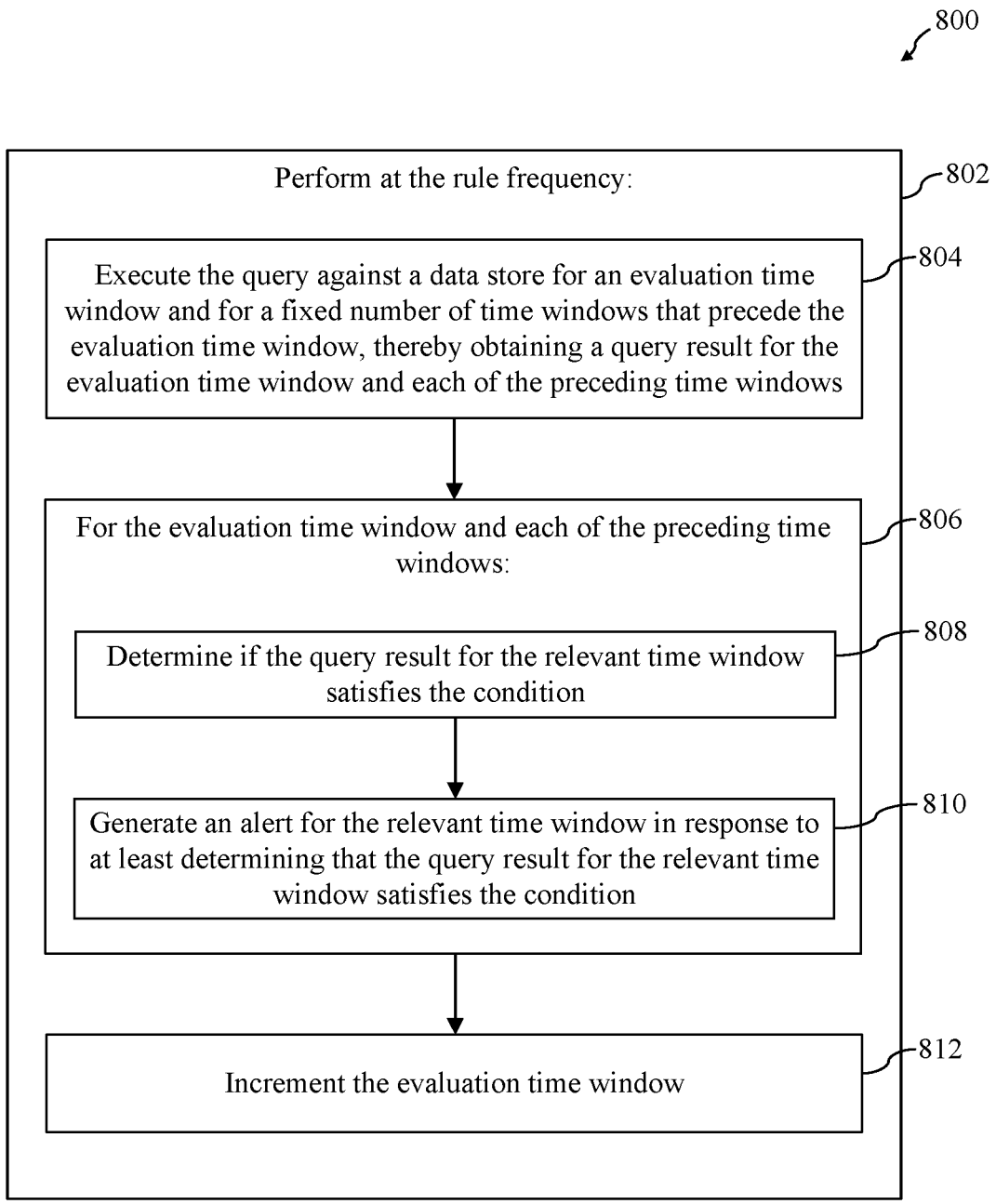
FIG. 8 depicts a flowchart of a method for evaluating an invariant alert rule in accordance with an embodiment.

To address this issue, in an embodiment, invariant alert rule evaluator 122 evaluates an invariant alert rule in the manner shown in flowchart 800 of FIG. 8. In particular, as shown in FIG. 8, invariant alert rule evaluator 122 evaluates an invariant alert rule by performing the following operations at the rule frequency (802): (A) executing the alert rule query against data store 104 for an evaluation time window and for a fixed number of time windows that immediately precede the evaluation time window, thereby obtaining a query result for the evaluation time window and each of the preceding time windows (804); (B) for the evaluation time window and each of the preceding time windows (806): (i) determining if the query result for the relevant time window satisfies the condition (808); and (ii) generating an alert for the relevant time window in response to at least determining that the query result for the relevant time window satisfies the condition (810); and (C) incrementing the evaluation time window (812).

In accordance with the foregoing approach, instead of using retries to execute the same query multiple times for the same evaluation time window, the alert rule query that is executed at the alert rule frequency is modified so that its scope is extended to also cover previous time windows. Thus, no extra queries need to be executed beyond those which would have otherwise been executed at the alert rule frequency. In practice, this approach provides the same results as if the query were retried against the same evaluation time window, but at a greatly reduced cost. That is to say, since most databases and database management systems are optimized to handle queries with time windows of different sizes, the costs associated with expanding the scope of the alert rule query run at the alert rule frequency is far less than the cost of retrying queries against data store 104.

To further illustrate this, assume that an alert rule is scheduled to run at 01-01-2020, 01:00:00 with an evaluation time window of 5 minutes, a frequency of 5 minutes, and a condition of "greater than threshold value N." Using an example retry-based approach, the alert rule may be evaluated against the evaluation time window 00:55:00-01:00:00 by executing the query at 01:00:00 and then retrying the query at 01:15:00 and 01:30:00. As noted above, such retries will adversely impact system performance and increase COGS. In contrast, using the approach described above in relation to invariant alert rule evaluator 122, the modified alert rule query run at 01:00:00 will not only capture data from evaluation time window 00:55:00-01:00:00 but will also capture data from previous time windows up to 30 minutes ago such as 00:50:00-00:55:00, 00:45:00-00:50:00, 00:40:00-00:45:00, 00:35:00-00:40:00 and 00:30:00-00:35:00. Thus, in accordance with this approach, for evaluation time window 00:55:00-01:00:00, the system provides the equivalent of a retry at 01:05:00, 01:10:00, 01:15:00, 01:20:00, 01:25:00 and 01:30:00 without having to run a single additional query.

The number of previous time windows captured by each query can be determined, for example, based on a maximum allowed data ingestion latency for alerting associated with monitoring system 100. Thus, for example, if the maximum allowed data ingestion latency for alerting is 30 minutes, then there is no need to capture data for previous time windows that precede the last 30 minutes.

As compared to a retry-based approach for dealing with data ingestion latency, the foregoing approach can provide a reduction in the number of queries that must be executed against data store 104. Furthermore, in accordance with the foregoing approach, if the alert rule frequency is greater than the planned retry frequency, then an "equivalent" retry can be achieved faster than a planned retry (thereby better handling data ingestion latency) and more "equivalent" retries can be obtained than planned retries at a far reduced cost.

The following is an example pseudocode representation of a method for modifying an alert rule query to capture data for additional time windows to facilitate implementation of the foregoing operation of invariant alert rule evaluator 122:

---

1. Let Q be the alert rule query
2. Let $T_1, T_2, ..., T_n$ be the tables from which data is taken, where n are the number of tables in the query
3. Let $W_1, W_2, ..., W_m$ be the time windows on which the query is going to run, where m is the number of time windows (buckets) to be covered ($W_1.b$ is the beginning of the time window and $W_1.e$ is the end).
4. Let $T_{ij}=T_i$ | where time between $W_j.b$ and $W_j.e$, where $1 \le i \le n$ and $1 \le j \le m$
5. Let $Q_1, Q_2, ..., Q_m$ be $Q_i$ where each $T_1, T_2, ..., T_n$ is substituted with view of $T_{1i}, T_{2i}, ..., T_{ni}$
6. $Q_{optimized}$ = union $(Q_1, Q_2, ..., Q_m)$

---

As noted above, if alert rule type determiner 120 determines that an alert rule is variant, then such alert rule will be evaluated by variant alert rule evaluator 124. For a variant rule, the alert rule condition can change from satisfied to unsatisfied over time as more data arrives. Accordingly, for a variant rule, latent data ingestion can lead to the triggering of false alerts.

Figure 9:
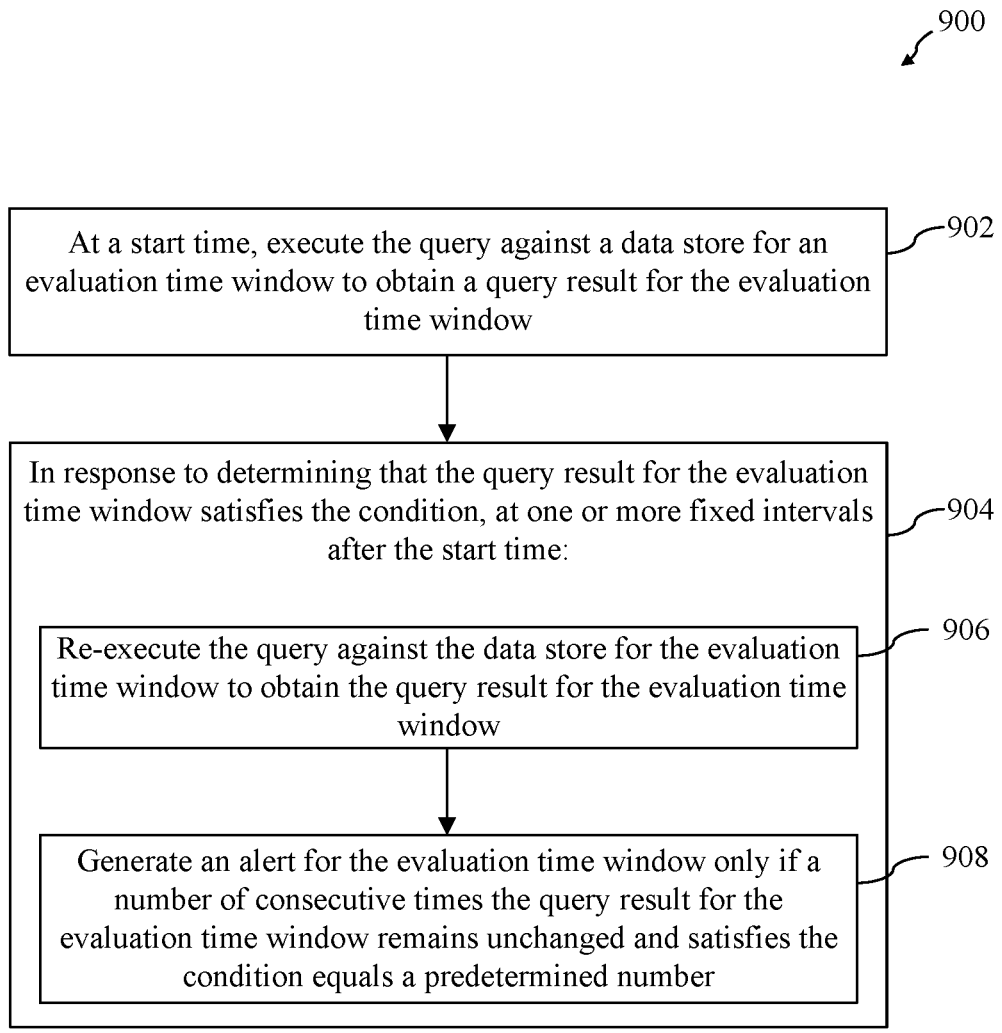
FIG. 9 depicts a flowchart of a method for evaluating a variant alert rule in accordance with an embodiment.

To address this issue, in an embodiment, variant alert rule evaluator 124 evaluates a variant alert rule in the manner shown in flowchart 900 of FIG. 9. In particular, as shown in FIG. 9, variant alert rule evaluator 124 evaluates a variant alert rule by performing the following operations: (A) at a start time, executing the alert rule query against data store 104 for an evaluation time window to obtain a query result for the evaluation time window (902); and (B) in response to determining that the query result for the evaluation time window satisfies the condition, at one or more fixed intervals after the start time (904): (1) re-executing the query against the data store for the evaluation time window to obtain the query result for the evaluation time window (906); and (2) generating an alert for the evaluation time window only if a number of consecutive times the query result for the evaluation time window remains unchanged and satisfies the condition equals a predetermined number (908). The re-executions at fixed intervals may be carried out a predetermined number of times.

In accordance with the foregoing approach, the following parameters can be said to control the execution of the variant alert rule query against a particular evaluation time window: (1) the start time for the first execution of the query; (2) the interval time between subsequent executions of the query; and (3) the number of consecutive times the query result must remain unchanged and the alert rule condition remain satisfied before an alert is generated. These parameters may be selected in view of the overall data ingestion latency statistics for a monitoring system to achieve a desired balance between alert latency and alert precision. Thus, for example, a start time may be selected to ensure that a significant enough amount of data has arrived to make the initial evaluation worthwhile. Likewise, the interval time may be selected to ensure that a meaningful amount of additional data will have arrived since the previous evaluation. Furthermore, the number of consecutive times may be selected to ensure a desired degree of alert precision. In certain embodiments, the variant alert rule evaluation process can be fine-tuned by enabling system administrators or other users the ability to assign values to the foregoing parameters. For example, monitoring system 100 may comprise a user interface (such as alert user interface 112 or some other user interface implemented on a computing device) with which a system administrator or other user can interact to assign values to one or more of the foregoing parameters.

As an example of how variant alert rule evaluation works, consider an implementation of the foregoing approach in which the start time is 30 seconds, the interval time is 2½ minutes, and the number of consecutive times is 2. In accordance with such an implementation, variant alert rule evaluator 124 will evaluate a variant alert rule at its alert rule frequency, with a delay of 30 seconds from T0 due to the designated start time. Accordingly, at 30 seconds after T0, variant alert rule evaluator 124 will execute the alert rule query against data store 104 to obtain a query result for a particular evaluation time window. Variant alert rule evaluator 124 will then determine whether the query result for the evaluation time window satisfies the alert rule condition. If variant alert rule evaluator 124 determines that the query result for the evaluation time window does not satisfy the condition, then that time window will never be reevaluated.

However, if variant alert rule evaluator 124 determines that the query result for the evaluation time window does satisfy the condition, then variant alert rule evaluator 124 will not generate an alert but instead will store an indication that the condition has been satisfied once for this evaluation time window and will also store the query result. Variant alert rule evaluator 124 will then re-execute the query against data store 104 for the same evaluation time window at 2½ minute intervals after the start time until such time as (a) the condition is no longer met or (b) the number of consecutive times the query result for the evaluation time window remains unchanged and satisfies the condition reaches two, in which case an alert is generated. As will be evident to persons skilled in the relevant art(s), to test condition (b), variant alert rule evaluator 124 maintains a record of the query results and whether the condition is satisfied for each query re-execution.

In some embodiments, the re-execution of the alert rule query at fixed intervals may align with the normal execution of the alert rule query at the rule frequency. In such embodiments, the scope of the alert rule being run at the rule frequency can be expanded to capture data for the time window targeted by the re-execution (e.g., in the manner discussed above in reference to FIG. 7), thereby avoiding the running of an extra query against data store 104. In other embodiments, retries may be used to re-execute a query.

The foregoing approach to evaluating variant alert rules in a manner that accounts for latent data ingestion provides a number of distinct advantages. For example, since this approach only re-executes a query in cases where an alert condition is determined to be satisfied and since most alert conditions are satisfied infrequently, the number of query re-executions and associated COGS is kept relatively small as compared to an approach in which all queries are re-executed. Furthermore, in accordance this approach, there is no need to obtain and update latency statistics for monitoring agents since the approach itself ensures data stability. Also, as noted above, the variant alert rules evaluation process can be made configurable by allowing users to modify control parameters associated therewith, thereby enabling the process to be flexibly adapted to different systems having different data ingestion latency characteristics.

As noted above, variant alert rule evaluator 124 may execute an alert rule query against data store 104 at different points in times for the same evaluation time window. In an embodiment, variant rule evaluator 124 is configured to collect and analyze the query results obtained in this manner for multiple different time evaluation windows to determine how quickly the query results stabilized over time for the particular query. Based on this information, variant alert rule evaluator 124 may configure any one of the aforementioned parameters for controlling variant alert rule evaluation (e.g., start time for the first execution of the query; interval time between subsequent executions of the query; and number of consecutive times the query result must remain unchanged and the alert rule condition remain satisfied before an alert is generated). Thus, in accordance with such an embodiment, variant alert rule evaluator 124 can automatically customize its approach to variant alert rule evaluation on a rule-by-rule basis. For example, this approach can help prevent the generation of false alerts by determining that a particular alert rule query has a consistently long latency and by configuring the variant alert rule parameters accordingly to ensure that the rule is not evaluated too early relative to its latency.

It is noted that the aforementioned approaches to evaluating alert rules may cause the same evaluation time window to be evaluated multiple times. Consequently, this gives rise to the possibility that an alert could be triggered more than once for the same evaluation time window. To address this issue, alert rule evaluator 110 is configured to store and/or obtain state information for each time window that can be used to determine whether a particular alert has already been issued for that time window. In accordance with such an embodiment, if alert rule evaluator 110 determines that an alert should be generated for a particular time window, it will first consult the state information to determine if the alert has already been generated for that time window. If the state information indicates that the alert has already been generated for that time window, then alert rule evaluator 110 will not generate the alert. However, if the state information indicates that the alert has not already been generated for that time window, then alert rule evaluator 110 will generate the alert.

III. Example Computer System Implementation

Each of monitoring agents 1021-102N, data store 104, alert rule creation tool 106, alert rules store 108, alert rule evaluator 110, alert user interface 112, alert rule type determiner 120, invariant alert rule evaluator 122, variant alert rule evaluator 124, alert rule query classifier 200, query preprocessor 202, feature extractor 204, machine learning model 206, decision tree 300, flowchart 400, flowchart 500, flowchart 600, flowchart 700, flowchart 800 and flowchart 900 may be implemented in hardware, or hardware combined with software and/or firmware. For example, each of monitoring agents 1021-102N, data store 104, alert rule creation tool 106, alert rules store 108, alert rule evaluator 110, alert user interface 112, alert rule type determiner 120, invariant alert rule evaluator 122, variant alert rule evaluator 124, alert rule query classifier 200, query preprocessor 202, feature extractor 204, machine learning model 206, decision tree 300, flowchart 400, flowchart 500, flowchart 600, flowchart 700, flowchart 800 and flowchart 900 may be implemented as computer program code/instructions configured to be executed in one or more processors and stored in a computer readable storage medium. Alternatively, each of monitoring agents 1021-102N, data store 104, alert rule creation tool 106, alert rules store 108, alert rule evaluator 110, alert user interface 112, alert rule type determiner 120, invariant alert rule evaluator 122, variant alert rule evaluator 124, alert rule query classifier 200, query preprocessor 202, feature extractor 204, machine learning model 206, decision tree 300, flowchart 400, flowchart 500, flowchart 600, flowchart 700, flowchart 800 and flowchart 900 may be implemented as hardware logic/electrical circuitry.

For instance, in an embodiment, one or more, in any combination, of monitoring agents 1021-102N, data store 104, alert rule creation tool 106, alert rules store 108, alert rule evaluator 110, alert user interface 112, alert rule type determiner 120, invariant alert rule evaluator 122, variant alert rule evaluator 124, alert rule query classifier 200, query preprocessor 202, feature extractor 204, machine learning model 206, decision tree 300, flowchart 400, flowchart 500, flowchart 600, flowchart 700, flowchart 800 and flowchart 900 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
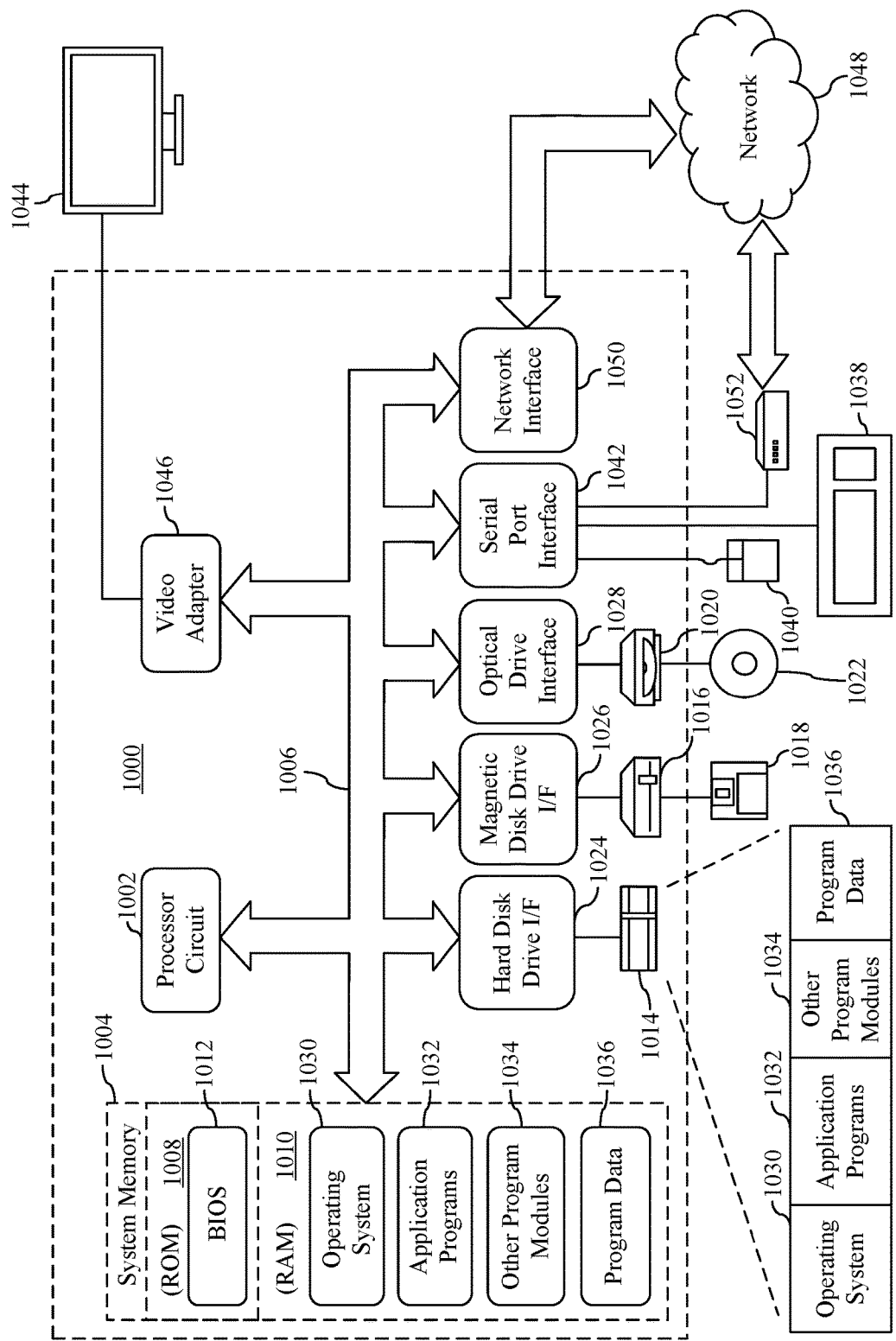
FIG. 10 depicts an example processor-based computer system that may be used to implement various embodiments described herein.

FIG. 10 depicts an example processor-based computer system 400 that may be used to implement various embodiments described herein, including each of monitoring agents 1021-102N, data store 104, alert rule creation tool 106, alert rules store 108, alert rule evaluator 110, alert user interface 112, alert rule type determiner 120, invariant alert rule evaluator 122, variant alert rule evaluator 124, alert rule query classifier 200, query preprocessor 202, feature extractor 204, machine learning model 206, decision tree 300, flowchart 400, flowchart 500, flowchart 600, flowchart 700, flowchart 800 and flowchart 900. The description of system 1000 provided herein is provided for purposes of illustration and is not intended to be limiting. Embodiments may be implemented in further types of computer systems, as would be known to persons skilled in the relevant art(s).

As shown in FIG. 10, system 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random-access memory (RAM) 1010. A basic input/output system 1012 (BIOS) is stored in ROM 1008.

System 1000 also has one or more of the following drives: a hard disk drive 1014 for reading from and writing to a hard disk, a magnetic disk drive 1016 for reading from or writing to a removable magnetic disk 1018, and an optical disk drive 1020 for reading from or writing to a removable optical disk 1022 such as a CD ROM, DVD ROM, BLU-RAY™ disk or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as flash memory cards, digital video disks, random access memories (RAMs), read only memories (ROM), and the like.

A number of program modules or components may be stored on the hard disk, magnetic disk, optical disk, ROM, or RAM. These program modules include an operating system 1030, one or more application programs 1032, other program modules 1034, and program data 1036. In accordance with various embodiments, the program modules may include computer program logic that is executable by processor circuit 1002 to perform any or all the functions and features of monitoring agents 1021-102N, data store 104, alert rule creation tool 106, alert rules store 108, alert rule evaluator 110, alert user interface 112, alert rule type determiner 120, invariant alert rule evaluator 122, variant alert rule evaluator 124, alert rule query classifier 200, query preprocessor 202, feature extractor 204, machine learning model 206, decision tree 300, flowchart 400, flowchart 500, flowchart 600, flowchart 700, flowchart 800 and flowchart 900 as described above.

A user may enter commands and information into system 1000 through input devices such as a keyboard 1038 and a pointing device 1040. Other input devices (not shown) may include a microphone, joystick, game controller, scanner, or the like. In one embodiment, a touch screen is provided in conjunction with a display 1044 to allow a user to provide user input via the application of a touch (as by a finger or stylus for example) to one or more points on the touch screen. These and other input devices are often connected to processor circuit 1002 through a serial port interface 1042 that is coupled to bus 1006, but may be connected by other interfaces, such as a parallel port, game port, or a Universal Serial Bus (USB). Such interfaces may be wired or wireless interfaces.

A display 1044 is also connected to bus 1006 via an interface, such as a video adapter 1046. In addition to display 1044, system 1000 may include other peripheral output devices (not shown) such as speakers and printers.

System 1000 is connected to a network 1048 (e.g., a local area network or wide area network such as the Internet) through a network interface or adapter 1050, a modem 1052, or other suitable means for establishing communications over the network. Modem 1052, which may be internal or external, is connected to bus 1006 via serial port interface 1042. As used herein, the terms "computer program medium," "computer-readable medium," and "computer-readable storage medium" are used to generally refer to memory devices or storage structures such as the hard disk associated with hard disk drive 1014, removable magnetic disk 1018, removable optical disk 1022, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media.

As noted above, computer programs and modules (including application programs 1032 and other program modules 1034) may be stored on the hard disk, magnetic disk, optical disk, ROM, or RAM. Such computer programs may also be received via network interface 1050, serial port interface 1042, or any other interface type. Such computer programs, when executed or loaded by an application, enable system 1000 to implement features of embodiments of the present methods and systems described herein. Accordingly, such computer programs represent controllers of the system 1000.

Embodiments are also directed to computer program products comprising software stored on any computer useable medium. Such software, when executed in one or more data processing devices, causes a data processing device(s) to operate as described herein. Embodiments of the present methods and systems employ any computer-useable or computer-readable medium, known now or in the future. Examples of computer-readable mediums include but are not limited to memory devices and storage structures such as RAM, hard drives, floppy disks, CD ROMs, DVD ROMs, zip disks, tapes, magnetic storage devices, optical storage devices, MEMS, nanotechnology-based storage devices, and the like.

IV. Additional Example Embodiments

A monitoring system is described herein. The monitoring system comprises one or more processors and one or more memory devices that store program code to be executed by the one or more processors. The program code comprises an alert rule type determiner and an invariant rule evaluator. The alert rule type determiner is configured to receive an alert rule that comprises a query, a condition, and a rule frequency, and determine whether the alert rule is invariant or variant. The invariant rule evaluator is configured to perform the following operations at the rule frequency in response to a determination that the alert rule is invariant: (a) execute the query against a data store for an evaluation time window and for a fixed number of time windows that precede the evaluation time window, thereby obtaining a query result for the evaluation time window and each of the preceding time windows; (b) for the evaluation time window and each of the preceding time windows: (i) determine if the query result for the relevant time window satisfies the condition; and (ii) generate an alert for the relevant time window in response to at least determining that the query result for the relevant time window satisfies the condition; and (c) increment the evaluation time window.

In one embodiment of the foregoing monitoring system, the alert rule type determiner is configured to determine whether the alert rule is invariant or variant by: classifying the query as one of an increasing query or a non-increasing query; and determining whether the alert rule is invariant or variant based on at least the query classification and the condition.

In further accordance with such an embodiment of the foregoing monitoring system, the alert rule type determiner is configured to classify the query as one of an increasing query or a non-increasing query by: obtaining a set of features associated with the query; and providing the set of features as input to a machine learning model that classifies the query as one of an increasing query or a non-increasing query based on the set of features. The machine learning model may comprise, for example, a Random Forest model.

In still further accordance with such an embodiment of the foregoing monitoring system, the alert rule type determiner is configured to classify the query as one of an increasing query or a non-increasing query by: analyzing query results obtained by executing the query against the data source for a particular time window at different points in time; and classifying the query as one of an increasing query or a non-increasing query based at least on the analysis.

In another embodiment of the foregoing monitoring system, the invariant rule evaluator is configured to generate the alert for the relevant time window in response to at least determining that the query result for the relevant time window satisfies the condition by: generating the alert for the relevant time window in response to determining that the query result for the relevant time window satisfies the condition and that the alert has not already been generated for the relevant time window.

In yet another embodiment of the foregoing monitoring system, the monitoring system further comprises a variant alert rule evaluator that is configured to perform the following in response to a determination that the alert rule is variant: (a) at a start time, execute the query against the data store for the evaluation time window to obtain a query result for the evaluation time window; and (b) in response to determining that the query result for the evaluation time window satisfies the condition, at one or more fixed intervals after the start time: (i) re-execute the query against the data store for the evaluation time window to obtain the query result for the evaluation time window; and (ii) generate an alert for the evaluation time window only if a number of consecutive times the query result for the evaluation time window remains unchanged and satisfies the condition equals a predetermined number.

In further accordance with such an embodiment of the foregoing monitoring system, the variant rule evaluator is configured to determine at least one of the start time, the fixed interval, and the predetermined number based on a statistical analysis of how quickly query results stabilize over time for a number of different queries executed against the data source.

In still further accordance with such an embodiment of the foregoing monitoring system, the monitoring system further comprises a user interface that enables a user to set one or more of the start time, the fixed interval and the predetermined number.

A method for alert rule evaluation in a monitoring system is also described herein.

The method includes: receiving an alert rule, the alert rule comprising a query, a condition, and a rule frequency; determining whether the alert rule is invariant or variant; and in response to determining that the alert rule is variant: (a) at a start time, executing the query against a data store for an evaluation time window to obtain a query result for the evaluation time window; and (b) in response to determining that the query result for the evaluation time window satisfies the condition, at one or more fixed intervals after the start time: (i) re-executing the query against the data store for the evaluation time window to obtain the query result for the evaluation time window; and (ii) generating an alert for the evaluation time window only if a number of consecutive times the query result for the evaluation time window remains unchanged and satisfies the condition equals a predetermined number.

In one embodiment of the foregoing method, determining whether the alert rule is invariant or variant comprises: classifying the query as one of an increasing query or a non-increasing query; and determining whether the alert rule is invariant or variant based on at least the query classification and the condition.

In further accordance with such an embodiment of the foregoing method, classifying the query as one of an increasing query or a non-increasing query comprises: obtaining a set of features associated with the query; and providing the set of features as input to a machine learning model that classifies the query as one of an increasing query or a non-increasing query based on the set of features. Providing the set of features to a machine learning model that classifies the query as one of an increasing query or a non-increasing query based on the features may comprise providing the set of features to a Random Forest model that classifies the query as one of an increasing query or a non-increasing query based on the features.

In still further accordance with such an embodiment of the foregoing method, classifying the query as one of an increasing query or a non-increasing query comprises: analyzing query results obtained by executing the query against the data source for a particular time window at different points in time; and classifying the query as one of an increasing query or a non-increasing query based at least on the analysis.

In another embodiment of the foregoing method, the method further comprises determining at least one of the start time, the fixed interval, and the predetermined number based on a statistical analysis of how quickly query results stabilize over time for a number of different queries executed against the data source.

In yet another embodiment of the foregoing method, the method further comprises providing a user interface that enables a user to set one or more of the start time, the fixed interval and the predetermined number.

In a further embodiment of the foregoing method, the method further comprises: in response to determining that the alert rule is invariant, performing at the rule frequency: (a) executing the query against the data store for the evaluation time window and for a fixed number of time windows that immediately precede the evaluation time window, thereby obtaining a query result for each of the evaluation time window and the preceding time window(s); (b) for each of the evaluation time window and the preceding time window(s): (i) determining if the query result for the relevant time window satisfies the condition; and (ii) generating an alert for the relevant time window in response to at least determining that the query result for the relevant time window satisfies the condition; and (c) incrementing the evaluation time window.

In further accordance with such an embodiment of the foregoing method, generating the alert for the relevant time window in response to at least determining that the query result for the relevant time window satisfies the condition comprises: generating the alert for the relevant time window in response to determining that the query result for the relevant time window satisfies the condition and that the alert has not already been generated for the relevant time window.

Another method for alert rule evaluation is described herein. The method comprises: receiving an alert rule, the alert rule comprising a query, a condition, and a rule frequency; determining whether the alert rule is invariant or variant; and in response to determining that the alert rule is invariant, performing at the rule frequency: (a) executing the query against a data store for the evaluation time window and for a fixed number of time windows that immediately precede the evaluation time window, thereby obtaining a query result for the evaluation time window and each of the preceding time windows; (b) for the evaluation time window and each of the preceding time windows: (i) determining if the query result for the relevant time window satisfies the condition; and (ii) generating an alert for the relevant time window in response to at least determining that the query result for the relevant time window satisfies the condition; and (c) incrementing the evaluation time window.

In one embodiment of the foregoing method, generating the alert for the relevant time window in response to at least determining that the query result for the relevant time window satisfies the condition comprises: generating the alert for the relevant time window in response to determining that the query result for the relevant time window satisfies the condition and that the alert has not already been generated for the relevant time window.

V. Conclusion

While various embodiments of the present methods and systems have been described above, they have been presented by way of example only, and not limitation. It will be apparent to persons skilled in the relevant art that various changes in form and detail can be made therein without departing from the spirit and scope of the methods and systems. Thus, the breadth and scope of the present methods and systems should not be limited by any of the above-described exemplary embodiments but should be defined only in accordance with the following claims and their equivalents.

What is claimed is:

1. A method for alert rule evaluation in a monitoring system, comprising:
receiving an alert rule, the alert rule comprising a query and a condition;
determining that the alert rule is variant;
in response to determining that the alert rule is variant:
executing, at a start time, the query against a data store for an evaluation time window to obtain a query result for the evaluation time window;
determining that the query result for the evaluation time window satisfies the condition;
in response to determining that the query result for the evaluation time window satisfies the condition:
re-executing, in accordance with a fixed time interval and after the start time, the query against the data store for the evaluation time window to obtain the query result for the evaluation time window;
determining a number of consecutive times the query result for the evaluation time window remains unchanged;
determining that the number of consecutive times equals a predetermined number; and
generating an alert for the evaluation time window in response to determining that the number of consecutive times equals the predetermined number.

2. The method of claim 1, wherein determining that the alert rule is variant comprises:
classifying the query as an increasing query or a non-increasing query; and
determining that the alert rule is variant based on at least the classifying and the condition.

3. The method of claim 2, wherein classifying the query as one of the increasing query or the non-increasing query comprises:
obtaining a set of features associated with the query; and
providing the set of features as input to a machine learning model that classifies the query as one of the increasing query or the non-increasing query based on the set of features.

4. The method of claim 3, wherein the machine learning model comprises a Random Forest model.

5. The method of claim 2, wherein classifying the query as one of the increasing query or the non-increasing query comprises:
analyzing query results at different points in time; and
classifying the query as one of the increasing query or the non-increasing query based at least on the analysis.

6. The method of claim 1, further comprising determining at least one of the start time, the fixed time interval, and the predetermined number based on a statistical analysis related to stabilization of query results over time for a number of different queries executed against the data source.

7. The method of claim 1, further comprising providing a user interface that enables a user to set at least one of the start time, the fixed time interval, or the predetermined number.

8. A monitoring system, comprising:
one or more processors; and
one or more memory devices that store program code that, when executed by the one or more processors, cause the monitoring system to:
receive an alert rule, the alert rule comprising a query and a condition;
determine that the alert rule is variant;
in response to determining that the alert rule is variant:
execute, at a start time, the query against a data store for an evaluation time window to obtain a query result for the evaluation time window;
determine that the query result for the evaluation time window satisfies the condition;
in response to determining that the query result for the evaluation time window satisfies the condition:
re-execute, in accordance with a fixed time interval and after the start time, the query against the data store for the evaluation time window to obtain the query result for the evaluation time window;
determine a number of consecutive times the query result for the evaluation time window remains unchanged;
determine that the number of consecutive times equals a predetermined number; and
generate an alert for the evaluation time window in response to determining that the number of consecutive times equals the predetermined number.

9. The monitoring system of claim 8, wherein determining that the alert rule is variant comprises:
classifying the query as one of an increasing query or a non-increasing query; and
determining that the alert rule is variant based on at least the classifying and the condition.

10. The monitoring system of claim 9, wherein classifying the query as one of the increasing query or the non-increasing query comprises:
obtaining a set of features associated with the query; and
providing the set of features as input to a machine learning model that classifies the query as one of the increasing query or the non-increasing query based on the set of features.

11. The monitoring system of claim 10, wherein the machine learning model comprises a Random Forest model.

12. The monitoring system of claim 9, wherein classifying the query as one of the increasing query or the non-increasing query comprises:
analyzing query results at different points in time; and
classifying the query as one of the increasing query or the non-increasing query based at least on the analysis.

13. The monitoring system of claim 8, wherein the program code further causes the monitoring system to determine at least one of the start time, the fixed time interval, and the predetermined number based on a statistical analysis related to stabilization of query results over time for a number of different queries executed against the data source.

14. The monitoring system of claim 8, wherein the program code further causes the monitoring system to provide a user interface that enables a user to set at least one of the start time, the fixed time interval, or the predetermined number.

15. One or more memory devices that store program code that, when executed by one or more processors, cause a monitoring system to:
receive an alert rule, the alert rule comprising a query and a condition;
determine that the alert rule is variant;
in response to determining that the alert rule is variant:
execute, at a start time, the query against a data store for an evaluation time window to obtain a query result for the evaluation time window;
determine that the query result for the evaluation time window satisfies the condition;
in response to determining that the query result for the evaluation time window satisfies the condition:
re-execute, in accordance with a fixed time interval and after the start time, the query against the data store for the evaluation time window to obtain the query result for the evaluation time window;
determine a number of consecutive times the query result for the evaluation time window remains unchanged;
determine that the number of consecutive times equals a predetermined number; and
generate an alert for the evaluation time window in response to determining that the number of consecutive times equals the predetermined number.

16. The one or more memory devices of claim 15, wherein determining that the alert rule is variant comprises:
classifying the query as one of an increasing query or a non-increasing query; and
determining that the alert rule is variant based on at least the classifying and the condition.

17. The one or more memory devices of claim 16, wherein classifying the query as one of the increasing query or the non-increasing query comprises:
obtaining a set of features associated with the query; and
providing the set of features as input to a machine learning model that classifies the query as one of the increasing query or the non-increasing query based on the set of features.

18. The one or more memory devices of claim 16, wherein classifying the query as one of the increasing query or the non-increasing query comprises:
analyzing query results at different points in time; and
classifying the query as one of the increasing query or the non-increasing query based at least on the analysis.

19. The one or more memory devices of claim 15, wherein the program code further causes the monitoring system to determine at least one of the start time, the fixed time interval, and the predetermined number based on a statistical analysis related to stabilization of query results over time for a number of different queries executed against the data source.

20. The one or more memory devices of claim 15, wherein the program code further causes the monitoring system to provide a user interface that enables a user to set at least one of the start time, the fixed time interval, or the predetermined number.

* * * * *